United States Patent [19]

Katagi

[11] 4,128,834
[45] Dec. 5, 1978

[54] RANGE MARK GENERATION

[75] Inventor: Kazuo Katagi, Woodland Hills, Calif.

[73] Assignee: RCA Corporation, New York, N.Y.

[21] Appl. No.: 790,661

[22] Filed: Apr. 25, 1977

[51] Int. Cl.² ........................... G01S 9/00; G08B 5/36
[52] U.S. Cl. .............................. 343/5 EM; 343/5 SC; 343/5 W; 340/324 AD
[58] Field of Search ................ 343/5 EM, 5 W, 5 SC; 315/377; 340/324 AD

[56] References Cited

U.S. PATENT DOCUMENTS

| | | | |
|---|---|---|---|
| 3,396,377 | 8/1968 | Strout | 340/324 AD |
| 3,646,557 | 2/1972 | Scheer | 343/5 EM |
| 3,794,993 | 2/1974 | Christopher | 343/5 EM |
| 3,898,644 | 8/1975 | Baxter | 340/324 AD |

OTHER PUBLICATIONS

*IBM Technical Disclosure Bulletin*, vol. 17, no. 6, pp. 1677-1679, Nov. 1974, L.B.Ii, "Radar Digital Scan Converter".

Primary Examiner—Maynard R. Wilbur
Assistant Examiner—Lawrence Goodwin
Attorney, Agent, or Firm—H. Christoffersen; Joseph D. Lazar; Raymond E. Smiley

[57] ABSTRACT

In a digital weather radar display, of the type which displays information on a cathode ray tube in the form of parallel intensity modulated sweep lines and which displays range marks in the form of a plurality of arcs of concentric circles, the positions of the range marks along each of the sweep lines are determined by utilizing a read only memory which stores, for each sweep line, an indication of the distance between range marks and the distance from the beginning of scan of the line to the first range mark.

8 Claims, 4 Drawing Figures

RANGE MARK GENERATION

CROSS REFERENCE TO RELATED APPLICATION

This application is related to the following copending application, U.S. application Ser. No. 799,079, filed May 20, 1977, entitled "Image Resolution Enhancement Method and Apparatus" by K. Katagi.

BACKGROUND OF THE INVENTION

Conventional radar display systems utilize a cathode ray tube display which manifests on the display screen weather or target information or other significant events and spaced apart concentric circular or arcuate lines termed range marks, at successive radial distances from an origin. The range marks provide an indication to an operator of the distance from the radar antenna, which corresponds to the origin on the display screen, to targets or weather patterns of interest. In conventional radar systems the display pattern is created by successive sweep lines radiating from the origin. In such systems range marks are easily created by providing a momentary video signal representing each range mark at appropriate points along each scan line, the points being the same radial distance along each scan line.

Most modern radars, at least of the airborne weather displaying type, digitize information to be displayed and store in a digital memory the digitized information functionally for each scan line as a series of digital numbers each corresponding to desired luminance at successive points along the scan line. If the information is displayed as a series of radial sweep lines, as above described, range mark creating signals may be stored in the digital memory.

If the information is displayed in the form of a series of parallel sweep lines the range mark to range mark spacing varies from line to line as does the spacing from the origin of each sweep line to the portion of the first range mark in that line. Therefore unlike the relatively simple apparatus for generating range marks in radars which utilize radial sweep lines, apparatus for generating range marks in parallel scan radars is more complex. Parallel sweep radar indicators receive information at successive radial lines as do the more conventional radars. A radial to parallel sweep line converter is provided which converts each digital signal at a particular distance along a particular azimuth to a corresponding signal at a particular location along a particular parallel scan line, which signal is then stored in memory and caused to periodically refresh the display CRT. The same converter can be utilized to determine the location of each range mark along each sweep line, which information is then stored in digital memory along with the other information to be displayed.

Due to the cost of digital memories it is desired to keep the number of bits of storage at a minimum which results undesirably in relatively poor resolution on the display screen as compared to the resolution capability of a typical cathode ray tube display. It has been found empirically that such resolution for the display of weather information is adequate but such resolution results undesirably in only a course approximation to a circle for the range mark information which has been found unacceptable.

SUMMARY OF THE INVENTION

In accordance with the invention in a display device of the cathode ray tube type which displays variable information by means of a succession of scan lines, various points along each scan line being intensity modulated in accordance with the information to be there displayed and wherein at predetermined points along the scan lines nonvariable information is to be displayed, a means separate from the means which provides the variable data is provided for storing for each scan line the location of nonvariable information along the scan line. A means is provided which is responsive to a signal from the first named means indicative of a location along the scan line where information is to be displayed and to CRT deflection signals indicative of the CRT electron beam being at that point for intensity modulating the display screen to display the fixed information.

DETAILED DESCRIPTION OF A PREFERRED EMBODIMENT

Figure 1:
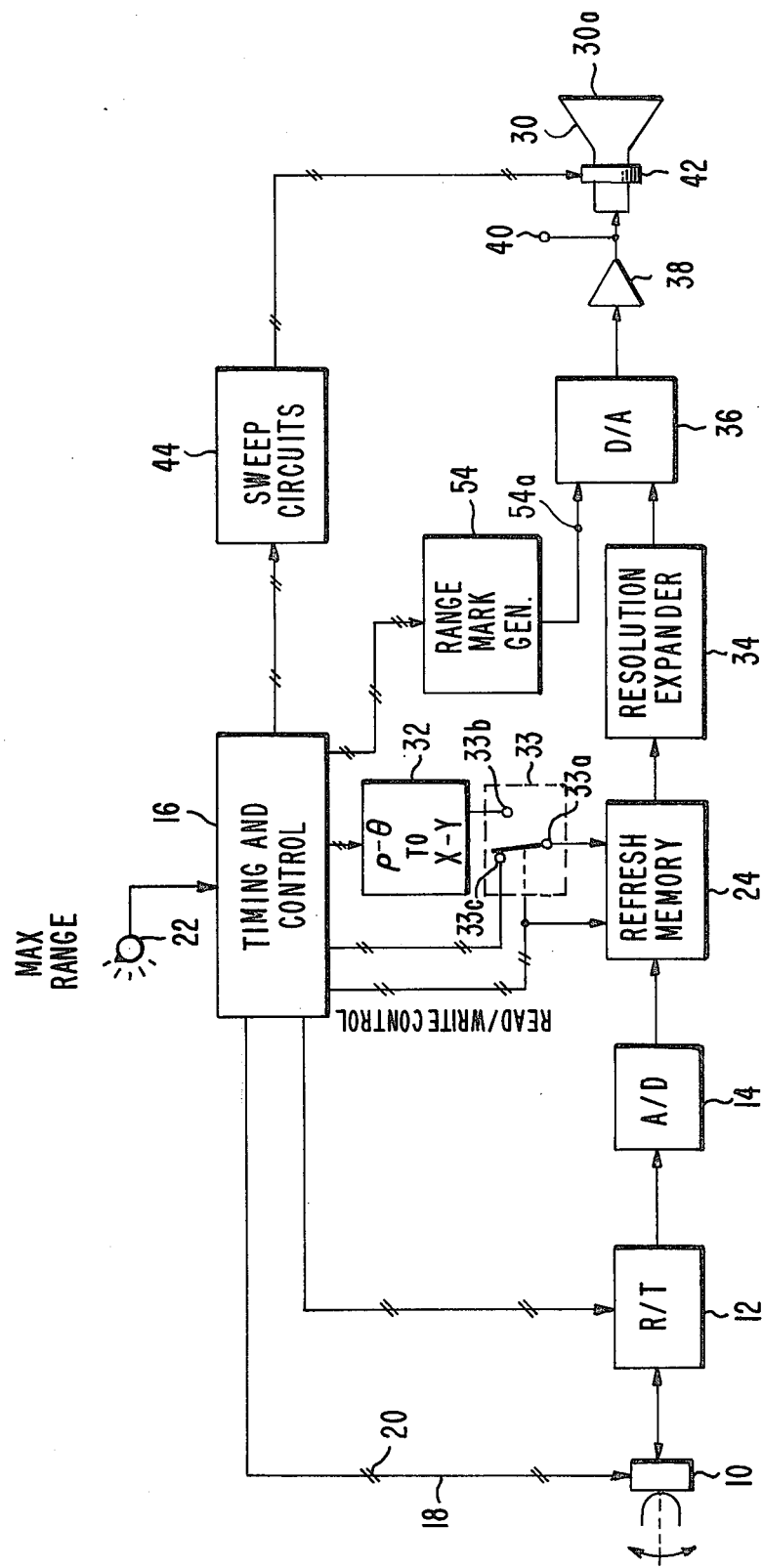
FIG. 1 is an airborne weather radar system in block diagram form which employs the present invention.

In FIG. 1 an airborne digital weather radar system includes a pivotable antenna 10, a receiver transmitter (RT) 12 coupled to antenna 10 for purposes of transmitting via the antenna periodic radar pulses each at a different azimuth or angle and for receiving from antenna 10 radar back scatter signals which indicate, as a function of time, atmospheric conditions at increasing distances from the antenna at a given a azimuth and then at successive distances at successive azimuths. RT 12 is coupled to an analog to digital converter (AD) 14 which converts analog signals received from RT 12 into corresponding multibit digital signals. In a typical airborne digital radar system AD 14 has a two bit or four level capability. A timing and control circuit (TC) 16 is coupled by means of a multiconductor cable 18 to antenna 10 to control its angular position. All multiconductor cables are denoted by a cross hatching symbol such as 20. TC 16 is also coupled to RT 12 to control the spacing of radar transmitter pulses. A multi-position Maximum Range switch 22 is coupled to TC 16 permitting an operator to set one of a plurality of maximum ranges of interest to him. The setting of range switch 22 controls the period of digital signals being passed from AD 14 to and stored in a refresh memory 24 to which AD 14 is coupled. TC 16 typically produces signals which via converter 32 (to be described below) are coupled to refresh memory 24 such that a given fixed number of digital signals at successive incremental distances along each azimuth are stored for each setting of maximum range switch 22. Thus, for relatively short maximum ranges, the period of digital signals will be short while for maximum range settings of relatively great distances the period of digital signals stored in refresh memory 24 will be relatively long.

Refresh memory 24 stores digital weather information functionally as it is to be displayed on a cathode ray tube (CRT) display device 30 which, in the case of the exemplary radar being described is by means of raster scan lines. Since the radar information is received in the so-called rho-theta format, that is, by azimuth or angle and by radial distance from the origin or antenna, a rho-theta to X-Y scan converter (SC) 32 is provided. SC 32 is coupled to TC 16 to receive signals representative of the angle and distance of each digital signal emitting from AD 14 and is coupled via terminals 33a and 33b of a switch 33 to memory 24 to provide row and column addressing for storage of the digital information in a row and column format. In one exemplary radar, memory 24 is capable of storing 16,384 two bit digits which are arranged functionally as 128 columns each containing 128 two bit digits. Address lines from TC 16 are coupled via terminals 33a and 33c of switch 33 to memory 24 to control addressing for readout purposes. A read/write control line from TC 16 is coupled to memory 24 for purposes of controlling reading therefrom and writing thereto and coupled to switch 33 to control the position of arm 33d thereof.

Memory 24 is coupled to a resolution expander circuit 34 which may be of the type described and claimed in the aforementioned copending application Ser. No. 799,079. Resolution expander 34 is a 1:4 data expander which creates serially 256 two bit digits for each of 256 columns from the 128 columns each containing 128 two bit digits as stored in memory 24.

Resolution expander 34 is coupled to a digital-to-analog converter (DA) 36. DA 36 produces appropriate analog voltages corresponding to each two bit signal it receives which analog signal is amplified by amplifier 38 and applied to video modulation terminal 40 of CRT display device 30 for purposes of intensity modulating successive locations on display screen 30a. Display device 30 includes X and Y or horizontal and vertical deflection means 42 which receive signals from TC 16 via conventional sweep circuits 44 for positioning the video beam to desired points on display screen 30a.

Amplifier 38, CRT 30, deflection means 42 and sweep circuits 44 may all be part of a standard TV receiver which is altered essentially only by the elimination of the tuner section and the rotation of deflection means 42 such that successive lines of information received at terminal 40 are scanned from bottom to top rather than from left to right as with a normal television receiver.

Figure 3:
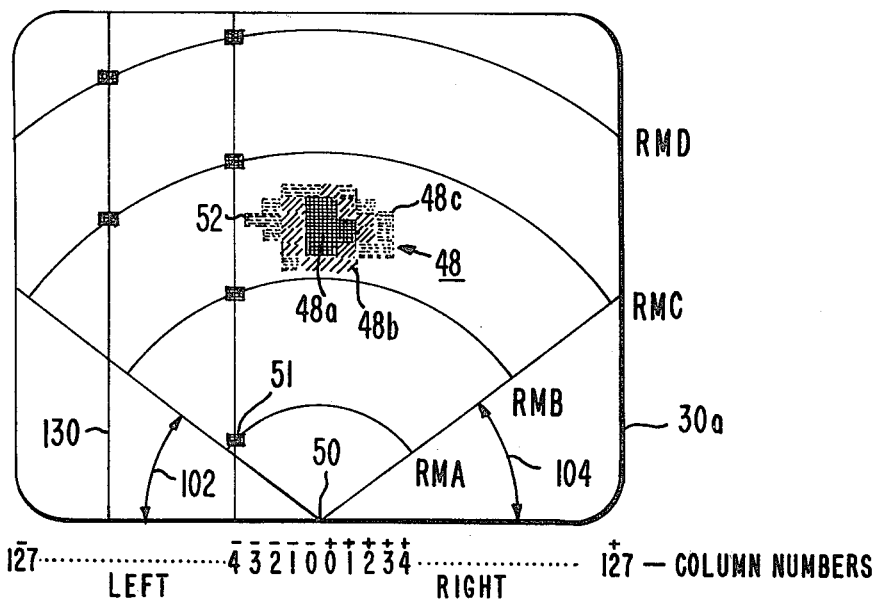
FIG. 3 is the viewing screen surface of a display device illustrated in FIG. 1.

Referring to FIG. 3 which illustrates display 30a, an exemplary storm cloud 48 is illustrated which is composed of a high brightness portion (illustrated with double cross hatched lines 48a), a medium brightness portion (illustrated with single cross hatched lines 48b) and a low brightness portion (illustrated as dashed lines 48c). It will be noted that the size of each of the display elements of cloud 48 is greatly exaggerated relative to the size of display screen 30a since the cloud extends from scan line 4 left through scan line 3 right which is illustrated as occupying about one fourth of the screen 30a width whereas all 256 scan lines fill the entire screen.

Display screen 30a includes, in addition to weather information, four arcuate range marks RMA, RMB, RMC, and RMD at successive radial distances from origin 50 which corresponds to the location of antenna 10 (FIG. 1). The distance from the origin represented by each range mark will depend upon the setting of maximum range switch 22 (FIG. 1). Each range mark is created by producing a spot of predetermined luminance at a particular location along each of a plurality of scan lines. These marks, such as 51, are termed video marks. Taken together the succession of video marks at a given radial distance comprise a range mark. If the range mark information were to be stored in refresh memory 24 the spots produced on display screen 30a would be as large as each of those in cloud pattern 48, spot 52 being exemplary. Such granularity is unacceptable for video marks.

Therefore, returning to FIG. 1, a range mark generation circuit 54 is provided which is coupled to TC 16 to receive information in real time concerning the sweep line number of the sweep line which is occurring on CRT display screen 30a. Range mark generator 54 is coupled to DA 36 to apply thereto, video signals for each scan line at the proper times for positioning video mark spots representing each range mark along the scan line.

Figure 2:
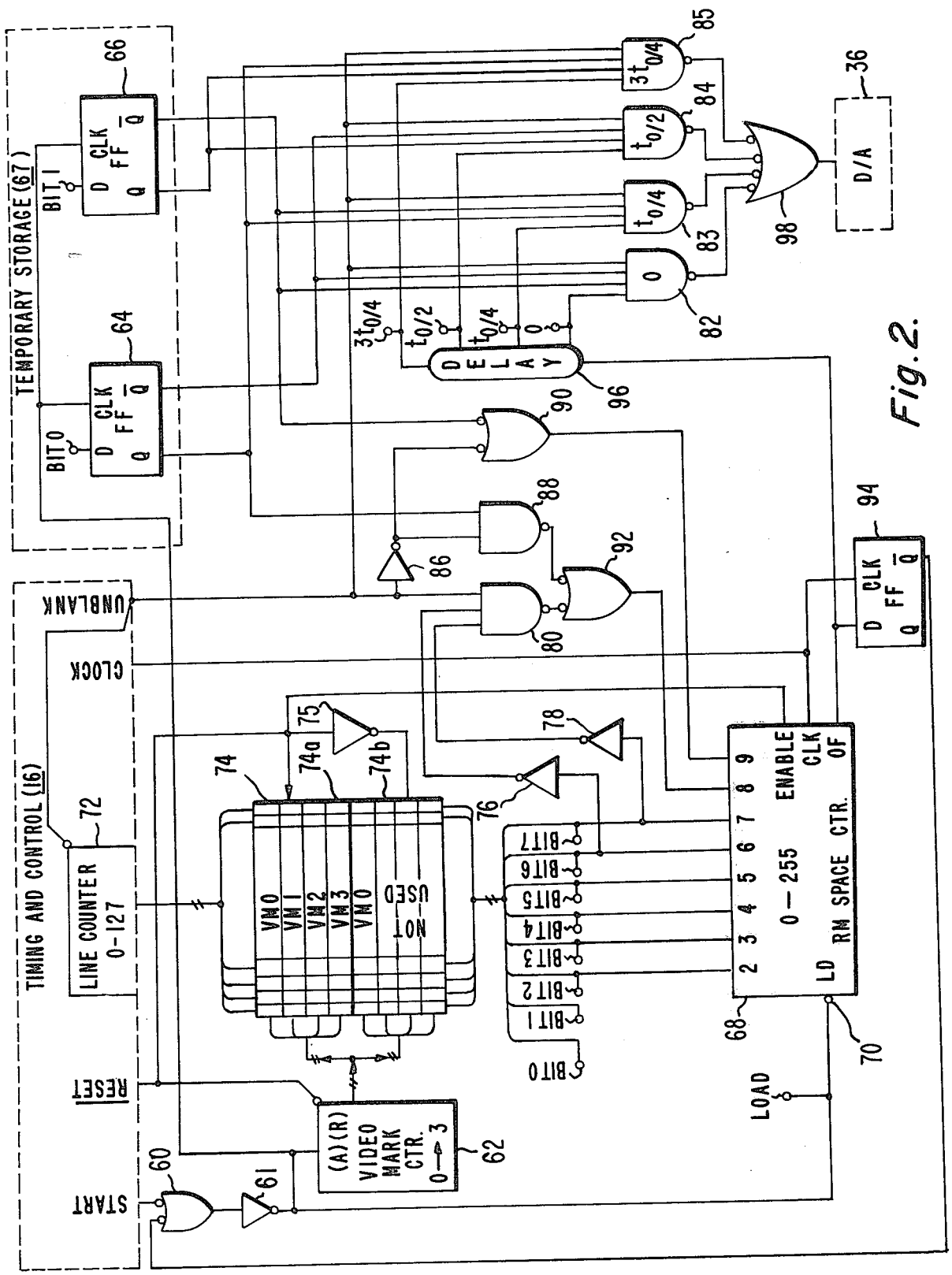
FIG. 2 is a preferred embodiment of a range mark generation circuit in block and logic diagram form in accordance with the present invention.
Figure 4:
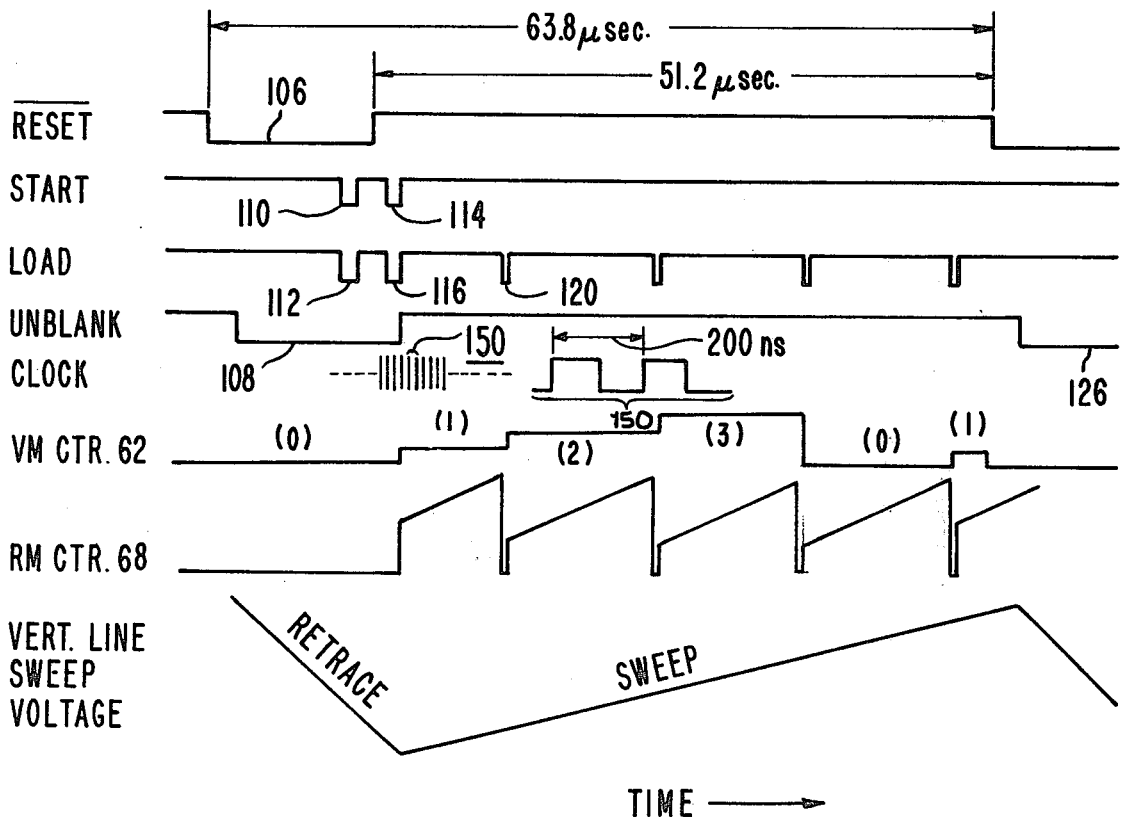
FIG. 4 is a set of waveforms useful in understanding the operation of the range mark generating circuit of FIG. 2.

Range mark generator 54 is illustrated in detail in FIG. 2 to which attention is now directed. All elements in FIG. 2, except those legended 16 and 36 located within respective dotted boxes, are elements within range mark generator block 54 (FIG. 1). As mentioned in connection with FIG. 1, TC 16 performs various timing and control functions. In particular it includes a master clocking means (not illustrated) which, at appropriate times, produces the signals labeled START, RESET, CLOCK AND UNBLANK. These signals and others are illustrated in FIG. 4 which should be referred to as desired. The START signal from TC 16 is coupled to one input of a NAND gate 60, the output terminal of which is coupled to an inverter 61. The output terminal of inverter 61, $\overline{LOAD}$, is coupled to the advance (A) terminal of a video mark counter 62, to the clock (CLK) input terminal of flip flops 64 and 66 which comprise a temporary storage means 67, and to the LD terminal of a range mark space counter 68.

The small circle 70 at the LD terminal of counter 68 and elsewhere in FIG. 2 indicates an inverting terminal. Most elements in FIG. 2 are activated (advanced, loaded, set, reset, etc.) by a relatively high voltage (hereinafter termed a logic 1) input signal or by a transition from a relatively low voltage to a relatively high voltage (logic 1 going transition). Where however an inverting symbol such as 70 is present, a relatively low voltage (hereinafter termed logic 0) input signal or logic 0 going transition activates the device.

The $\overline{RESET}$ timing signal generated within TC 16 is coupled to an inverting reset (R) terminal of counter 62, to the upper half 74a of a read only memory (ROM) 74, to the ENABLE input terminal of counter 68 and via inverting amplifier 75 to the lower half 74b of ROM 74. By means of the connections to ROM 74, $\overline{RESET}$ enables either the upper or lower half of the ROM. Counter 62 has a count capability as great as the number of range marks required which in the exemplary radar being described is four. Counter 62 is coupled to ROM 74 to control in part the address of the memory.

Functionally ROM 74 includes an upper half 74a and a lower half 74b as mentioned previously. Each half includes four sections labeled VM0, VM1, VM2 and VM3, respectively. Three sections of the lower half of ROM 74 are not used by the range mark generator circuitry but are used elsewhere in the radar system. Each of the four sections comprises 128 individually addressed bytes of information,, each byte comprising 8 binary digits (8 bits). Line counter 72 is coupled to ROM 74 to address a specific byte within each section. Line counter 72 may be an up-down counter which in response to each UNBLANK signal decrements by a count of one from 127 to 0 corresponding to the left 128 scan lines on display screen 30a (FIG. 3) and then increments by one from 0 to 127 corresponding to the right 128 scan lines (See FIG. 3) in alternate succession. The counter is adapted to stay at a count of 0 for two UNBLANK pulses providing left and right zero sweep lines. Further the counter is adpated to step to a count of 0 at the end of right column 127 UNBLANK signal and remain at a count of 0 until the next UNBLANK signal is generated after an appropriate horizontal flyback time, at which time the counter steps "down" to a count of 127 corresponding to left column 127. Alternatively, a complimenting circuit may be provided intermediate counter 72 and ROM 74 in which case the count from counter 72 is complimented for one of the left half sweep lines for an up-counter (one which counts up for each input pulse) or right half sweep lines for a down-counter on display screen 30a. (FIG. 3).

The outputs of each of bits 2-7 of all bytes contained within ROM 74 are coupled to respectively numbered input terminals of a presettable counter 68 while bits 6 and 7 are additionally coupled through inverting amplifiers 76 and 78 respectively to two input terminals of a NAND gate 80. Bits 0 and 1 from ROM 74 are coupled respectively to the D input terminal of flip flops 64 and 66. The UNBLANK signal from TC 16 is coupled to the third input terminal of NAND gate 80, to an input of each of NAND gates 82, 83, 84 and 85 and via an inverting amplifier 86 to NAND gate 88 and to an inverting terminal of NAND gate 90. NAND gates 80 and 88 are coupled to inverting input terminals of NAND gate 92. The output terminals of NAND gates 92 and 90 are coupled to input terminals 8 and 9 respectively of counter 68.

The Q terminal of flip flop 64 is coupled to one input terminal of each of NAND gates 83, 85 and 88 while the $\overline{Q}$ terminal is coupled to an input terminal of each of NAND gates 82 and 84. The Q output terminal of flip flop 66 is coupled to one terminal of each of NAND gates 84 and 85 while the $\overline{Q}$ terminal is coupled to one input terminal of each of NAND gates 82 and 83 and to an inverting input terminal of NAND gate 90.

The CLOCK timing signal from TC 16 is coupled to the CLK terminal of each of counter 68 and flip flop 94. The overflow (OF) terminal of counter 68, which produces a logic 1 signal when counter 68 is at its maximum count of 255, is coupled to the D terminal of flip flop 94 and to a delay line 96. Delay line 96 has tap off terminals denoted respectively 0, which is coupled to NAND gate 82, $t_0/4$, which is coupled to NAND gate 83 $t_0/2$, which is coupled to NAND gate 84 and $3t_0/4$ which is coupled to NAND gate 85. In one exemplary radar the basic period, $t_0$, of the CLOCK signal from TC 16 is 200 ns. Therefore the terminal marked $t_0/4$ produces a signal 50 ns after receipt of the logic 1 OF signal from counter 68 while terminals $t_0/2$ and $3t_0/4$ produce signals 100 and 150 ns respectively after receipt of the logic 1 OF signal from counter 68. Each of NAND gates 82-85 is coupled to an inverting terminal of a NAND gate 98. The output terminal of NAND gate 98 is coupled to DA converter 36 (FIG. 1).

Operation of the radar system of FIG. 1 is as follows. Under control of TC 16 antenna 10 is positioned to a given one of a plurality of discrete azimuth positions and caused to issue a radar transmitter pulse. Resultant radar back scatter return signals are detected, amplified, shaped etc. in RT 12, all in a conventional manner. The resultant signals which as a function of time, represent meteorological conditions, at increasing distances from antenna 10 are continuously digitized into one of four levels where level 0 may represent a clear sky and level 3 may represent a heavy concentration of rain while levels 1 and 2 are intermediate levels.

Periodically the digitized signal is sampled and stored in refresh memory 24. Since TC 16 issues azimuth advance signal to antenna 10 it is continuously aware of the azimuth to which antenna 10 is positioned. Further since TC 16 directs the issuance of radar transmitter pulses and since the travel distance of response signals per unit time is a known fixed quantity, the range of signals emitted from AD 14 are known to TC 16. Therefore, for each element of digital information to be recorded in memory 24 converter 32 generates a row Y and column X address in memory corresponding to the azimuth theta $\theta 0$ and range rho ($\rho$) location. The rate at which digitized information is stored in memory 24 is determined by the setting of maximum range switch 22. For relatively long maximum ranges the rate is relatively low; for relatively short maximum ranges the rate is relatively high. After returns have been received from the maximum range of interest at a given azimuth as determined by maximum range switch 22, TC 16 causes antenna 10 to pivot to a successive azimuth position and the above described process repeats to continually update refresh memory 24.

Independent of the rate at which information is placed in memory 24 the memory is read out at a rate to provide a flicker free image on display screen 30a. As mentioned previously memory 24 is organized functionally into 128 columns, each storing 128 two bit data cells. With reference to FIG. 3 it should be noted that since no data is displayed in areas 102 and 104, portions of the memory associated therewith will have no meaningful data stored therein. The read/write control signal from TC 16 and the address lines therefrom with switch 33 set as illustrated read out a column of data cells at a time from memory 24 to resolution expansion circuit 34, which for each column of 128 data cells generates two columns each of 256 two bit signals serially for conversion by DA 36 and amplifier 38 into appropriate video signals applied to terminal 40 of CRT 30. For each of the 256 columns or sweep lines of display elements, sweep deflection circuits 44 under control of TC 16 produce appropriate deflection sweep voltages which are applied to deflection means 42 causing the electron beam thereof to produce a vertical sweep line at an appropriate region on display screen 30a. The lowermost waveform in FIG. 4 is the vertical sweep voltage which causes the line sweep and retrace for each of the 256 sweep lines. The rate of the sweep lines in one exemplary embodiments is such that each of the display elements such as 52, FIG. 3, requires 200 ns (200 × $10^{-9}$) of sweep time. It should be noted in connection with the lowermost waveform that it is drawn in a rather idealized fashion with the "sweep" portion being shown as composed of only a linear line beginning at the rising or logic 1 going trailing edge of an UNBLANK pulse such as 108 and ending at the falling or logic 0 going leading edge of the following UNBLANK pulse such as 126. As is known to those skilled in the art the sweep waveform actually begins in time before the logic 1 going edge of the UNBLANK pulse but the CRT electron beam is adjusted to start at a point off the viewable screen edge and to come up to a constant velocity by the time it reaches the viewable screen edge. For purposes of discussion of the operation of the radar system, which follows shortly, the idealized waveform of Figure will be assumed to exist.

As each sweep line is being created in the above described manner, range mark generator 54 produces signals as required to produce the four arcuate range mark lines illustrated in FIG. 3. As each sweep line is created, generator 54 determines, as described in detail below, where along the line a video mark should appear, and causes a pulse to be applied to DA 36 on line 54a. The pulse on line 54a produces a signal at the output of DA 36 which causes the appropriate location on display screen 30a to be a given amount brighter than if only a display element signal appeared at DA 36. In the case of a "full" brightness (level 3) signal from resolution expander 34, the display screen 30a will be made brighter than "full" brightness. In the exemplary radar system, the duration of the range mark signal is 200 nanoseconds, the same as a standard display element but is positioned with 50 ns accuracy along the sweep line being generated.

Detailed operation of range mark generation circuit 54 is now described in connection with FIGS. 2 and 4. It will be assumed that sweep line 5 left has just been generated and the sweep line 4 left is about to be generated. Since in the exemplary radar, sweep lines are symmetrical about a line passing vertically through the origin, the range mark circuit 54 does not distinguish between left and right halves. Line counter 72 is assumed to be set to a count of five representing line 5. The logic zero on $\overline{\text{RESET}}$ resets video mark counter 62 and via inverter 75 primes the lower half 74b of ROM 74. Shortly thereafter, the logic 0 going UNBLANK pulse 108 decrements line counter 72 to a count of four which is applied to ROM 74. UNBLANK pulse 108 also disables NAND gate 80 and via inverter 86 primes gates 88 and 90 to pass information from flip flops 64 and 66 to counter 68. As a result of the various logic signals applied to ROM 74, byte 4 of VMO (lower half) appears on various ones of the bits zero through seven lines. In fact only bit zero and bit one contain any meaningful information which will ultimately, as described below, pass to inputs 8 and 9 in counter 68. Bits zero and one are applied respectively to flip flops 64 and 66 which are enabled to accept the bit zero and bit one signals upon the logic 1 going trailing edge of LOAD pulse 112 which is generated by START pulse 110. It should be noted that logic zero LOAD pulse 112 would normally cause the loading of counter 68 and the logic one going trailing edge of pulse 112 would normally advance counter 62 from a count of zero to a count of one. These actions do not occur, however, as the logic zero $\overline{\text{RESET}}$ pulse 106 keeps counter 62 reset and disables counter 68. Shortly after the occurrence of START pulse 110 and before the occurrence of START pulse 114, $\overline{\text{RESET}}$ transitions from logic zero to logic one removing the reset pulse from counter 62, and removing the disabling signal from the ENABLE terminal of counter 68 priming the counter to accept signals from the upper half of ROM 74. Thereafter, START pulse 114 generates LOAD pulse 116. LOAD pulse 116 strobed by the next occurring logic 1 going CLOCK pulse causes counter 68 to accept signals representing a number stored in byte 4 VM0 upper half (corresponding to sweep line 4) at terminals 2-7 and to accept at terminals 8 and 9 via enabled gates 88, 90 and 92 signals representing a number stored in byte 4 VM0 lower half which has been temporarily stored in temporary storage 67. At the trailing edge of logic one going edge of LOAD pulse 116, flip flops 64 and 66 accept bits 0 and 1 of byte four VM0 upper half of ROM 74.

In preparation for the later acceptance of VM1 data into counter 68, LOAD pulse 116 advances counter 62 to a count of one so that the VM1 portion of ROM 74 is primed. Further, since UNBLANK goes to logic one at the same time as LOAD pulse 116 goes to logic one, NAND gate 80 becomes primed while gate 88 is disabled. Further the logic 1 UNBLANK pulse inverted by inverter 86 forces the output of gate 90 to a logic 1.

The resulting number stored in counter 68 in part from ROM 74 and in part from temporary storage 67 represents the number of 200 nanosecond periods or number of display elements from the start of sweep line four to a position along sweep line four which is from 0 to 150 nanoseconds before the portion of range mark A, which is on sweep line four. Flip flops 64 and 66 contain the number which determines the location of the range mark to within one fourth of the 200 nanosecond period of each display element.

The number stored in counter 68 and temporary storage 67 may be thought of as representing either distance or time from the beginning of a scan line to the position along the scan line at which a video mark for range mark A is to be produced. For simplicity in explanation, counter 68 would most desirably be a decrementing counter which would decrement by one each time a logic one clock pulse is applied thereto. However, incrementing counters are less costly. Therefore the 1's compliment of a number of 200 nanoseconds periods to the first video mark is stored in ROM 74 and entered into counter 68. Alternatively, a number which is slightly greater or smaller than the desired number may be entered into counter 68 to compensate for logic element delays, etc. in the system.

In any event, after counter 68 is loaded by LOAD pulse 116 in combination with the next occurring logic 1 going clock pulse, it is incremented upon receipt of the leading edge of each logic one CLOCK pulse from TC 16. During this time sweep line four left is being traced upon display screen 30a by deflection signals from sweep circuit 44 (FIG. 1) at a known constant rate corresponding to the rate at which clock pulses are produced. In like manner, TC 16 controls the start of each vertical sweep signal and controls the loading of and counting by counter 68 as described above.

Due to the scale of the various waveforms in FIG. 4 individual pulses of the CLOCK waveform are difficult to illustrate. Therefore two illustrative cycles 150 of the CLOCK waveform are illustrated in expanded form. For the same reason it would be impractical to draw each actual increment of counter 68 by CLOCK pulses. Therefore, the waveform for that counter is simply illustrated as increasingly positive going line whereas it should be realized that in fact the counter increments in unit steps.

After an appropriate number of clock pulses at counter 68, it reaches a full count of 255 causing a logic 1 overflow (OF) signal to be generated by the counter. The OF signal is applied to delay 96 which produces logic 1 signals at successive 50 nanoseconds increments at successive output terminals. The output of each of the terminals occurs for a time corresponding to the desired length (along a sweep line) of a video mark. In the exemplary embodiment the duration of the logic one pulses from each output terminal is 200 ns.

Depending on the setting of flip flops 64 and 66, one of NAND gates 82-85 will be enabled to select an appropriately delayed signal from delay 96. A pulse from the one of gates 82-85 which is enabled will cause a 200 nanosecond pulse to be applied to DA 36 just as deflection circuits 44 cause the electron beam of sweep line 4 left to appear at the desired point on screen 30a. Therefore, an appropriate brightness video mark signal is applied to display screen 30a as sweep line 4 left continues to create a video mark thereon.

Thus, for example, if flip flop 64 is set while flip flop 66 is reset, the resultant logic one at the Q terminal of flip flop 64 and logic 1 at the $\overline{Q}$ terminal of flip flop 66 with the logic one UNBLANK signal primes NAND gate 83 while gates 82, 84, and 85 are disabled. Therefore, 50 nanoseconds after logic 1 OF signal is produced by counter 68, NAND gate 83 is enabled for 200 nanoseconds. for producing a pulse to create a video mark signal as before described.

It might appear that if range mark counter 68 were made a 10 stage counter rather than an 8 stage counter, as illustrated and if clock signals operated at a 20 MHz rate (1/50 ns) rather than a 5 MHz rate (1/200 ns) temporary storage 67, delay 96, and NAND gates 82-85 could be eliminated. Unfortunately just as decrementing counter 68 are more costly than incrementing counter, counters which can operate at a 20 MHz rate are also very expensive relative to counters which operate at a lower frequency.

The next logic one clock pulse following the one which stepped counter 68 to a count of 255 enables flip flop 94 to receive the logic 1 OF at the D input terminal making the $\overline{Q}$ terminal a logic 0 producing a logic 0 load pulse 120. The same clock pulse "advances" counter 68 to a count of 0 (previously logic 1 clock signals with a logic 0 OF signal have kept the $\overline{Q}$ terminal of flip flop 94 at logic one). Since counter 62 is at a count of one, load pulse 120 strobed by the next logic 1 going clock pulse (which also resets flip flop 94 making $\overline{Q}$ logic 0) loads bits 2-7 of the number stored in video mark one (VM1) upper half of sweep line four into counter 68 locations 2-7.

The value of the signal applied to counter 68 terminal 8 is created from bits 6 and 7 of ROM 74 as described below in detail. The creation of the signal to be applied to terminal 8 from bits 6 and 7 is possible since the spacing between range mark A and range mark B cannot be less than a certain amount and therefore any amount in ROM 74 indicative of a lesser amount is used to offset counter 68 by an amount which places the counter in the range of acceptable counts. Bit 9 in the counter is forced to a logic one since the space between range marks can never become so great as to require the use of the highest bit of the counter (remembering that since counter 68 when preset contains the 1's compliment of the spacing between range marks an "unused" bit is forced to a count of one — not "zero"). In this manner, the six bits of information transferred from ROM 74 to counter 68 are effectively translated into seven bits of useful information. The creation of signals to be applied to counter 68 terminals 8 and 9 is as follows.

Bits six and seven are inverted and applied to NAND gate 80. If bits six and seven are logic 0, the resulting logic 1 from NAND gate 92 is applied to terminal 8 of counter 68. If either or both of bits six and seven are logic 1, then a logic 0 is applied by NAND gate 92 to terminal 8 of counter 68. At the same time the logic 1 UNBLANK signal causes a resultant logic 0 at NAND gate 90 which causes a logic 1 to be applied to terminal 9 of counter 68.

At the trailing edge of a load pulse 120, flip flops 64 and 66 accept bits 0 and 1 respectively from ROM 74. Video mark counter 62 is advanced to a count of two after all information from video mark one is read out as described above. After counter 68 and flip flops 64 and 66 are loaded with the number that represents the distance or sweep time from range mark A to range mark B, CLOCK pulses once again advance counter 68. Meanwhile sweep line 4 left continues to be generated. Eventually, counter 68 reaches its maximum number and a further delay occurs as determined by the condition of flip flops 64 and 66 at which the expiration of a pulse is transmitted to DA 36 to create a video mark display screen 30a for range mark B.

For line four, the process above described repeats two more times to create video marks for range marks C and D. At the time the last video mark in a scan line is produced, another number which is meaningless will be loaded into counter 68 and into flip flops 64 and 66. The spacing between range marks is such that any number entered into counter 68 would produce a video mark beyond the upper screen edge of screen 30a. However, when the sweep reaches the edge of the screen a $\overline{\text{RESET}}$ signal occurs which disables counter 68 preventing it from issuing an OF pulse to produce a video mark until such time as a range mark generator circuitry 54 is recycled for the next sweep line, sweep line three left. It will be noted that not all sweep lines intersect four range marks. See for example sweep line legended 130 which intersects only two range marks. For such a scan line, the proper byte in VM0 will indicate the time or distance from the beginning of scan line to range mark C while the proper byte in the video mark one (VM1) section of ROM 74 will indicate the distance or time from a range mark C to a range mark D. For such a scan line, the VM2 and VM3 sections of ROM 74 contain no meaningful information.

It will be appreciated that the range mark generating circuitry just described can be used for displaying any fixed information. For example, if a display covers 360° and utilizes the same four range marks is illustrated in FIG. 3, sweep lines would be produced which passes through eight range marks which would be created by an enlarged ROM 74. Further there is no need for symmetry of the fixed information or any need for the fixed information to be arcuate in nature. Thus, for example, display screen 30a might contain a variable message received from refresh memory 24 surrounded by a fixed rectangular border which could be generated from range mark generating circuitry 54. Further the fixed information may be created by any means which is distinguishable from the surrounding variable data. Thus, for example, fixed information may be at a given intensity, may be of any intensity which contrasts with the variable data or may be in some distinguishing color. It should also be understood that in some situations the fixed information will not extend over all sweep lines. For such sweep lines range or fixed information a number may be stored in ROM 74 which is beyond the opposite screen 30a edge from that at which the sweep lines begin.

What is claimed is:

1. In a display system which includes a cathode ray tube display screen on which a variable image is created by an intensity modulatable electron beam deflected in parallel side-by-side sweep lines while being intensity modulated in accordance with said variable image and in which fixed information is to be concurrently displayed, apparatus for producing the fixed information comprises in combination:

circuit means, separate from circuit means for providing said variable image, for storing for each sweep line a value indicative of the distance from the origin of said each sweep line to a point along that sweep line at which said fixed information appears, said values differing for successive sweep lines;

means responsive to a particular sweep line being created for producing from said storage means a signal indicative of said value associated with said particular sweep line;

means responsive to said value indicating signal for producing a position signal indicating said electron beam is at a particular point along said particular sweep line at which said fixed information is to appear; and means responsive to said position signal for producing on said display the part of said fixed information associated with said particular sweep line;

wherein, for at least some of said sweep lines, said fixed information appears at more than one location therealong, and wherein said storing means includes means for storing for each such sweep line, values indicative of the distances between positions of said fixed information appearing at various points along each such sweep line, wherein said means responsive to said particular sweep line is also responsive to each position signal for producing a distance indicative signal of the distance to the next point at which fixed information is to be displayed.

2. The combination as set forth in claim 1 wherein said storing means is a read only memory which is functionally organized by sweep lines having a location for storing for each sweep line said value indicative of distance from the beginning of each sweep line to the location of the first occurrence of fixed information and for storing as applicable the value indicative of distance from one occurrence of fixed information to the next.

3. The combination as set forth in claim 2 wherein said means producing said signal from said storing means comprises first counter means producing a count indicative of said particular sweep line being created and second counter means producing a count indicative of the number of the next portion of said fixed information to be produced on said particular sweep line and wherein said count from said first and second counters are coupled to said read only memory for providing an address thereto for read out of a value therefrom.

4. The combination as set forth in claim 3 wherein said means for producing a position signal comprises a presettable counter coupled to said memory to receive said signal associated with said value therefrom for presetting said counter to a value which corresponds to the distance from said origin to said fixed information and further including a source of clock signals corresponding to said presettable counter for incrementally altering said presettable counter in synchronization with the movement of said electron beam along said sweep line.

5. The combination as set forth in claim 4 wherein said memory is accessed one block of storage at a time and wherein said value occupies more than one block of storage in memory and further including temporary storage means coupled to said memory for receiving and temporarily storing one block of storage therefrom and wherein said presettable counter is coupled both to said memory and to said temporary storage means for accepting information from both.

6. The combination as set forth in claim 4 wherein said position signal producing means further includes temporary storage means coupled to said memory and vernier distance determining means coupled to said temporary storage means and wherein said memory when accessed provides information both to said presettable counter and said temporary storage means and wherein said vernier distance determining means is responsive to signals from said presettable counter indicative of a predetermined location of said electron beam for producing said position signal at a later time corresponding to a further distance of said electron beam along said sweep line in accordance with the value stored in said temporary storage means.

7. In a radar display system employing a pivotable antenna for scanning, at least a sector of space to receive return signals therefrom for displaying on a screen an image corresponding to said return signals, said display screen also displaying at least one arcuate range mark line at a fixed radial distance about an origin which corresponds to said antenna, said image being created by a series of sweep lines each intensity modulated to produce said image including said arcuate range mark, apparatus for determining the position of the portion of said range mark along each sweep line on said display screen comprises in combination:

means for storing for each said sweep line a first value corresponding to the time required for the sweep line to sweep from the origin on said screen of said sweep line to the position of said portion of said range mark therealong;

means responsive to a particular sweep line being created for producing from said storage means a signal corresponding to said value associated with said particular sweep line;

means responsive to said value corresponding signal for producing, after a time laspe corresponding to the time indicated by said value corresponding signal, a position signal indicative of the position of said sweep along said particular sweep line at which said range mark appears; and means responsive to said position signal for producing on said screen the part of said range mark corresponding to the sweep line.

8. The combination as set forth in claim 7 wherein said radar display system includes means for producing side by side parallel sweep lines on said display screen.

* * * * *